United States Patent Office 3,717,204
Patented Feb. 20, 1973

3,717,204
METHOD AND COMPOSITION FOR TREATING HIGH-TEMPERATURE SUBTERRANEAN FORMATIONS
John W. Scheffel, Fullerton, and Paul W. Fischer, Whittier, Calif., assignors to Union Oil Company of California, Los Angeles, Calif.
No Drawing. Filed July 6, 1971, Ser. No. 160,091
Int. Cl. C08f 21/04, 45/52; F21b 33/138
U.S. Cl. 166—283                                    23 Claims

ABSTRACT OF THE DISCLOSURE

A water-insoluble particulate composition having controlled slow oil-solubility at elevated temperatures is disclosed. The composition is comprised of solid particles of homogeneous mixture of (1) about 2 to 15 weight percent of a polymer selected from the class consisting of polyethylene and ethylene-vinyl acetate containing about 15 to 30 weight percent vinyl acetate, or a combination of both, (2) about 75 to 90 weight percent of a paraffin wax having a melting point between about 130° F. and 175° F., and (3) about 1 to 20 weight percent of a solubility retarding agent selected from the group consisting of long chain aliphatic hydrocarbons, aliphatic amides and oxidized hydrocarbon waxes melting at a temperature between about 250° F. and 325° F. Also disclosed is a process employing this particulate composition in drilling wells into high-temperature subterranean formations, and in fracturing and treating such formations.

This invention relates to well drilling and treating, and more particularly to a method and composition for temporarily reducing the permeability of high-temperature, permeable oil-bearing formations. The method and compositions of this invention have particular application in hydraulic fracturing, in well treating, and in completing oil and gas wells that penetrate relatively high-temperature subterranean formations.

Although high fluid permeability is a desirable characteristic of a hydrocarbon producing formation, many drilling, fracturing and well treating operations are adversely affected when a well penetrates such highly permeable formations. The effectiveness and efficiency of these processes are substantially improved by temporarily plugging the more permeable strata to reduce the loss of drilling, fracturing, or well treating fluids thereto. Accordingly, low fluid loss agents have been developed for use in these applications. Also, particulate plugging agents are used as diverting agents in multiple fracturing operations, and to plug selected strata to obtain fluid shutoff.

In the aforesaid applications, it is essential that the temporary fluid loss control or plugging agent be readily removed from the hydrocarbon producing zones to prevent permanent loss of permeability and an attendant reduction in oil production rate. Removal may be effectively accomplished by utilizing an agent that is soluble in the formation hydrocarbons. However, many of the prior art materials are either insoluble under bottom hole conditions, or are so highly soluble that they are difficult to place in the formation and fail to maintain the required plug during the treating operation. It is therefore essential that the fluid loss or plugging agent possess the property of controlled solubility wherein a satisfactory solid plug will be formed for a period of time, and whereupon the plug will thereafter be removal by being slowly dissolved by the formation hydrocarbons.

It is also advantageous to utilize a material that is insoluble in water, thereby leaving any water producing strata permanently sealed. Thus, selective plugging is effected, the hydrocarbon producing strata being temporarily plugged and the water producing strata remaining permanently sealed. On removal of the temporary plugging agent from the hydrocarbon producing strata, oil and gas production capability is fully restored, while water production is permanently eliminated or substantially decreased.

Each of the aforesaid well treating processes commonly requires a temporary plugging material capable of being formed into small solid particles of controlled size, preferably by an inexpensive technique. The material should be slowly soluble in the formation hydrocarbons and insoluble in water at formation conditions to accomplish the desired selective plugging and complete restoration of hydrocarbon permeability. Particle size is important in controlling the distance that the plugging agent penetrates into the formation and the degree of fluid shut-off obtained. Therefore, it is essential that a large number of particles do not agglomerate or stick together in the treating fluid to form clumps of widely varying dimensions during the treating operation. While other properties of the particulate agent may influence particle agglomeration, agglomeration is largely controlled by the tackiness of the particle surface. Hence, it is necessary that the plugging particles or agents exhibit a low degree of tackiness on exposure to air at ambient temperatures and also remain non-tacky or non-sticky upon exposure to formation hydrocarbons and to the treating fluids. In addition, particles which are somewhat resilient possess superior plugging properties since they deform to effectively fill flow passages. Also, high mechanical and impact strength is desirable to avoid size reduction of individual particles by attrition.

Various slowly oil-soluble, water-insoluble particulate agents useful in well drilling and treating operations have been developed. In particular, U.S. Pat. No. 3,316,965 discloses the use of homogeneous solid particles of non-gaseous hydrocarbon and polymer; U.S. Pat. No. 3,342,263 discloses the use of discrete solid particles of homogeneous solid mixture of a polymer and a halogenated aromatic hydrocarbon melting above about 120° F.; U.S. Pat. No. 3,363,690 discloses the use of particles of a homogeneous solid mixture of a polymer and an alcohol melting above about 120° F.; and U.S. Pat. No. 3,302,719 discloses solid particles comprised of a homogeneous mixture of polymer, wax and resin. While these compositions are satisfactory in many well drilling and treating applications, and their use has contributed greatly to increased oil-recovery, they have not been completely successful in the treatment of high-temperature subterranean formations.

The bottomhole temperature of a well varies with the geographical location of the well and with its depth. Several producing wells, particularly in the United States and Canada, have bottomhole temperatures above 200° F., and often as high as 250° F., and above. In order that the treated wells can be returned to full production, the injected temporary plugging or diverting agents must be soluble in the reservoir oil at the reservoir temperature to the extent that substantially all of the plugging agent is removed within a reasonably short time, such as between about 1 and 6 days after returning the well to production. The solid compositions that are completely solubilized by the reservoir oil in less than 12 hours or greater than 6 days have been found to be undesirable for many of the well treating processes. Many of the compositions disclosed in the foregoing patents, while quite satisfactory for the treatment of formations having temperatures below about 180° F., are too soluble at higher temperatures to provide optimum treatment of the higher temperature formations, particularly those formations having temperatures between 200 and 250° F., and fail to provide an adequate plug for a sufficient period of time, or do not possess the requisite properties of strength and non-tackiness. Thus, there exists a need for a particulate solid composition that has the characteristic of controlled slow oil solubility at high formation temperatures, and particularly at temperatures between about 200 and 250° F., that is insoluble in water, and that exhibits other requisite properties of hardness, strength and non-tackiness.

Accordingly, it is an object of this invention to provide an improved well treating process for temporarily plugging high-temperature subterranean formations. Another object of the invention is to provide an improved well treating process for plugging or retarding fluid flow through high-temperature earth formations that does not permanently reduce the permeability of the formation to hydrocarbon fluids. Another object of the invention is to provide a process for fracturing high-temperature subterraneon formations wherein a diverting agent is deposited in the fracture to retard the flow of fracturing fluid therein so as to effect multiple fractions in the formation. Another object of the invention is to provide an effective low fluid loss additive for addition to a fracturing fluid. A still further object is to provide a low fluid loss additive to be added to a fluid placed in a well bore penetrating a high-temperature formation which will act to temporarily reduce the formation permeability without effecting a permanent reduction of the hydrocarbon permeability of the formation. A still further object is to provide a fluid loss additive which is soluble upon prolonged contact with reservoir hydrocarbons at a temperature between about 200 and 250° F. and that remains nontacky when incorporated into a treating fluid. Other objects and advantages of the invention will be apparent to those skilled in the art from the description thereof which follows.

The foregoing objects and their attendant advantages can be attained by treating the subterranean formation with a particulate material comprising discrete solid particles of a homogeneous mixture of (1) about 2 to 15 weight percent of a polymer selected from the class consisting of a polyethylene and ethylene-vinyl acetate, or combination thereof, (2) about 75 to 90 weight percent of a paraffin wax melting between about 130° F. and 175° F. and (3) about 1 to 20 weight percent of a solubility retarding agent selected from the group consisting of long-chain aliphatic hydrocarbons, aliphatic amides and oxidized hydrocarbon waxes having a melting point between about 250° F. and 325° F.

The particulate compositions of this invention are insoluble in water and slowly soluble in oil, and are particularly useful as fluid loss control agents and as diverting or plugging agents in treating and hydraulically fracturing subterranean earth formations having a temperature between about 200 and 250° F. penetrated by a well, and in the drilling of wells into such formations. The particulates can be employed in formations having higher temperatures if delayed solubility is not critical to the process or if a sufficient quantity of cool treating fluid is introduced into the well during the treating process to cool the formation adjacent to well to a temperature within the effective temperature range of the particles for controlled oil solubility, thereby allowing use of the particles in formations having temperatures that are normally above about 250° F., and even above about 260° F.

The oil solubility of the particulate composition can be determined by intimately contacting the particles with a test solvent such as crude petroleum recovered from the oil-bearing formation to be treated, or a similar liquid solvent, maintained at the temperature of the formation. The particulate compositions of this invention are slowly soluble in oil at a temperature between about 200° F. and 250° F. so that not more than 50 volume percent of the particles are dissolved by the oil during the first six hours of exposure to the oil, and at least 50 volume percent of the particles are dissolved during the last 18 hours of a 24 hour exposure period. Thus, the solid particulate composition can be employed in treating a wide range of high-temperature formations as the solid particles are substantially insoluble on contact with oil at a temperature below about 250° F. for a short period of time, such as six hours, and is completely dissolved or dispersed in the oil upon prolonged contact therewith at temperatures above about 200° F. so that substantially no solid residue remains to plug the oil-bearing strata of the formation.

The polyethylene polymer component of the solid compositions has a melt index of less than 100 and generally from 0.1 to 50 and preferably from 0.5 to 10 grams per 10 minutes. It has been found that polyethylene having a melt index greater than 100 is undesirable since such does not impart the desired slow solubility to the solid composition at high temperatures. Exemplary polyethylene polymers useful in the practice of this invention are listed below in Table I.

TABLE I

| Trademark | Supplier | Melt index (grams/10 minutes) |
| --- | --- | --- |
| Elvax 1820 | E. I. du Pont de Nemours & Co. | 11 |
| Petrothene LC943 | U.S.I. Chemicals | 0.4 |
| Petrothene LB830 | do | 0.15 |
| Petrothene LB600 | do | 1.0 |
| Petrothene LB861 | do | 1.8 |
| Petrothene 502 | do | 4-14 |

A particularly preferred polyethylene polymer for use in the compositions of this invention is a polyethylene polymer having a melt index of about 0.15 grams per 10 minutes.

The copolymer component is a copolymer of ethylene and vinyl acetate containing from 15 to 30 weight percent vinyl acetate, and preferably from about 17 to 19 weight percent vinyl acetate. It has been found that copolymers containing more than about 30 weight percent vinyl acetate are undesirable as they tend to separate from the molten blend, and that particulate compositions prepared from copolymers containing less than about 15 weight percent vinyl acetate are not sufficiently soluble in oil. The ethylene vinyl acetate copolymers which can be employed herein generally exhibit a melt index between about 1 and 500 grams per 10 minutes and good results can be obtained with copolymers having a melt index between about 1 and 50 grams per 10 minutes, and more preferably between about 2 and 5 grams per 10 minutes. Exemplary ethylene-vinyl acetate copolymers useful in the practice of this invention are listed in Table II.

TABLE II

| Trademark | Supplier | Melt index, gms./10 min. | Vinyl acetate content, wt. percent |
| --- | --- | --- | --- |
| Elvax 210 | E. I. du Pont de Nemours & Co. | 335–465 | 27–29 |
| Elvax 260 | do | 5–7 | 27–29 |
| Elvax 310 | do | 335–465 | 24–26 |
| Elvax 350 | do | 16–22 | 24–26 |
| Elvax 360 | do | 1.6–2.4 | 24–26 |
| Elvax 420 | do | 125–175 | 17–19 |
| Elvax 460 | do | 2.1–2.9 | 17–19 |

A particularly preferred copolymer for use in the compositions of this invention is an ethylene-vinyl acetate copolymer that contains 17 to 19 weight percent vinyl acetate and exhibits a melt index of about 2 to 3 grams per 10 minutes. A commercial ethylene-vinyl acetate copolymer exemplary of this preferred copolymer is marketed by E. I. du Pont de Nemours & Company under the trademark Elvax 460.

Another preferred copolymer is an ethylene-vinyl acetate copolymer that contains about 24 to 26 weight percent vinyl acetate and exhibits a melt index of about 1 to 3 grams per 10 minutes. A commercial ethylene-vinyl acetate copolymer exemplary of this copolymer is marketed by E. I. du Pont de Nemours & Company under the trademark Elvax 360.

The term "melt index" as employed herein is the flow rate reported as the rate of extrusion in grams per 10 minutes as determined by ASTM test method D1238–65T entitled "Measuring Flow Rates of Thermoplastics by Test Condition E, ASTM Standards, American Society Extrusion Plastometer" and performed under Standard for Testing and Materials, Part 27, June 1969, pages 455–466, which procedure is herein incorporated by reference.

The paraffin wax employed in the particulate compositions of this invention is a crystalline paraffin wax having a melting point between about 130° F. and 175° F., and preferably is a fully refined crystalline paraffin wax having a melting point between about 140° F. and 170° F., and more preferably between about 160° F. and 170° F. The paraffin wax is present in the composition in a major proportion such as from about 75 to 90 weight percent of the composition.

The oil solubility of the solid particulate compositions of this invention at the elevated formation temperature is controlled by the addition of a suitable solubility retarding agent which slows the rate of dissolution of the solid particles in oil without adversely affecting the other properties of the solid composition. Agents which can be incorporated into the homogeneous composition to retard the oil solubility of the particles include long chain aliphatic hydrocarbon, aliphatic hydrocarbon amides and oxidized hydrocarbon waxes which melt between about 250° F. and 325° F. A homogeneous solid particulate composition having the desired slow oil solubility can be prepared by the addition of about 1 to 20 weight percent of the retarding agents or combinations thereof having the aforementioned properties.

Long chain aliphatic hydrocarbon, hydrocarbon amides, and oxidized hydrocarbon waxes that can be employed as solubility retarding agents include certain high molecular weight natural and synthetic waxes such as carnauba wax, various Fischer-Tropsch waxes, and bis(fatty acid) amides melting between about 250° F. and 325° F. and preferably from 300 to 320° F. These waxes are characteristically straight or branched chain aliphatic hydrocarbons, long chain fatty acid amides and oxygenated aliphatic hydrocarbon compounds such as aliphatic carboxylic acids and esters having molecular weights higher than the paraffin waxes. Aromatic and cycloaliphatic hydrocarbon waxes are generally not satisfactory oil solubility retarding agents as they do not sufficiently reduce the oil solubility of the resulting solid particulate compositions. A preferred class of oil solubility retarding agents are long chain aliphatic hydrocarbon and oxidized hydrocarbon waxes having melting points between about 250° F. and 325° F. Exemplary oil solubility retarding agents are listed in Table III.

F. and 170° F., and (3) about 5 to 20 weight percent of Fischer-Tropsch synthetic wax having a melting point between about 250° F. and 325° F.

Another preferred composition comprises solid particles of a homogeneous mixture of (1) about 2 to 7 weight percent of a polyethylene polymer exhibiting a melt index of about 1 to 50 grams per 10 minutes, (2) about 80 to 90 weight percent of a fully refined crystalline paraffin wax having a melting point between about 160° F. and 170° F., and (3) about 5 to 70 weight percent of a Fischer-Tropsch synthetic wax having a melting point between about 250° F. and 325° F.

The solid particles used in the practice of this invention vary widely in size and shape. Typically, these particles can be spheroids, cubes, granules, buttons, flat disks, or mixtures thereof, having mean diameters in the range of from about ½-inch to about 1 micron and less. More particularly, the particles can be cubes, buttons, or disks having mean diameters of from about ⅛-inch to about ½-inch, spheroids or granules in the size range of from about 4 to 200 mesh U.S. Standard screen, or particles having mean diameters of from about 1 to 50 microns.

The compositions of this invention are useful in treating high-temperature subterranean formations having temperatures above about 200° F., and is especially useful in treating formations having temperatures between about 200° F. and 250° F. and in some instances in the treating of formations having temperatures greater than 250° F. In its broadest application, the process comprises contacting a subterranean formation penetrated by well with a suspension of solid particles of the aforesaid composition in a suitable carrier liquid injected through the well. This treatment can comprise a single temporary and selective plugging step, or it can be an integral part of a comprehensive fracturing, well drilling, acidizing, or solvent treating process. Also, the particulate composition of this invention can be effectively used as a low fluid loss agent in a drilling fluid employed in well drilling and particularly as a low fluid loss agent in completion fluids employed in the drilling of oil and gas wells. In the drilling and workover applications, the drilling fluid is circulated from the surface to the drilling zone in a high-temperature formation during the drilling operation, and at least a portion of the fluid is returned to the surface. The particulate compositions of this invention can be incorporated in the fracturing fluids employed in hydraulically fracturing an earth formation surrounding a well, and the

TABLE III

| Trademark | Supplier | Type | Chemical class | Average melting point, ° F. |
|---|---|---|---|---|
| Ruhrwax A616 | Dura Commodities Corp | Fischer-Tropsch wax | Oxidized hydrocarbon | 250 |
| Ruhrwax A613 | do | do | do | 250 |
| Carlisle 290 | Carlisle Chemical Works | Synthetic wax | Bis stearoylamide | 290 |
| Carlisle 315 | do | do | do | 315 |
| Ross Wax 160 | Frank B. Ross Co | do | Amide | 316 |
| Aerowax C | Glyco Chemical Co | do | Fatty acid diamide | 275 |
| Pentalyn C | Hercules Powder Co | do | Pentaaerythritol ester polymerized resin | 276 |

The compositions of this invention are readily prepared by melting the individual components and then admixing the molten liquids in the proper proportions. Alternatively, the solid ingredients can be combined in the proper proportion and then melted to obtain a homogeneous liquid mixture. In either case, the proportion of each component is selected to impart the desired properties to the final solidified product.

A particularly preferred particulate composition comprises solid particles of a homogeneous mixture of (1) about 2 to 7 weight percent of an ethylene-vinyl acetate copolymer having from 17 to 19 weight percent of vinyl acetate and exhibiting a melt index of about 2 to 3 grams per 10 minutes, (2) about 80 to 90 weight percent of a fully refined paraffin wax melting between about 160° composition can be employed in chemical treating, acidizing, and other well treating operations wherein it is desired to control fluid loss to permeable underground structures.

The particulate compositions of this invention can be more readily dispersed into a carrier liquid by the addition of a small amount of a surface active agent to the carrier liquid. Also, small amounts of a surface active agent or a mixture of surface active agents can be added to the dispersion to enhance the fluid loss properties of the particles. Furthermore, other types of fluid retarding agents such as viscosity increasing agents, solid inorganic particles, and the like, can be incorporated into the suspension of plugging particles, and the use of such agents in combination with the plugging particles is included within the scope of this invention.

The invention is further illustrated by the following examples which are illustrative of specific modes of practicing the invention and are not intended as limiting the scope of the invention as defined by the appended claims.

solubility difference of less than 50 volume percent upon contacting the solvent during the last 18 hours of the contacting period for all of the temperatures do not posses the desired delayed oil solubility and are designated as "unsatisfactory."

TABLE IV.—DELAYED OIL SOLUBILITY OF WAX-POLYMER COMPOSITIONS

| Example | Polymer component | | | | Retarding agent | | | Particle solubility [3] |
|---|---|---|---|---|---|---|---|---|
| | Trademark [1] | Type [2] | Contents, wt. percent | Melt index, gms./10 min. | Trademark [1] | Contents, wt. percent | Melting point, °F. | |
| 1 | Elvax 1820 | PE | 2 | 11.0 | | | | U |
| 2 | Elvax 460 | E-VA | 2 | 2.1-2.9 | | | | U |
| 3 | | | | | Ross Wax 160 | 10 | 316 | U |
| 4 | | | | | Carlisle 290 | 10 | 290 | U |
| 5 | Elvax 1820 | PE | 2 | 11.0 | Ross Wax 160 | 20 | 316 | S |
| 6 | do | PE | 2 | 11.0 | do | 15 | 316 | S |
| 7 | do | PE | 2 | 11.0 | do | 10 | 316 | S |
| 8 | Petrothene LB830 | PE | 2 | 0.15 | do | 5 | 316 | S |
| 9 | do | PE | 2 | 0.15 | Carlisle 290 | 20 | 290 | S |
| 10 | {Elvax 460 / Petrothene LB830} | E-VA / PE | 5 / 3 | 2.1-2.9 / 0.15 | Ruhrwax A616 | 5 | 250 | S |
| 11 | {Elvax 460 / Petrothene LB830} | E-VA / PE | 3 / 2 | 2.1-2.9 / 0.15 | Ross Wax 160 | 15 | 316 | S |
| 12 | Elvax 460 | E-VA | 10 | 2.1-2.9 | do | 15 | 316 | S |
| 13 | Elvax 460 | E-VA | 5 | 2.1-2.9 | do | 15 | 316 | S |
| 14 | Petrothene | PE | 20 | 0.15 | do | 10 | 316 | U |

[1] The description of the trademarks are presented supra in Tables I-III.
[2] The polymer designated as "PE" is polyethylene and as "E-VA" is ethylene-vinyl acetate.
[3] U represents unsatisfactory, S represents satisfactory.

EXAMPLES 1-14

The slow oil solubility of the three component compositions is demonstrated by a series of solubility tests. In each test, a solid tricomponent composition is prepared by admixing in their molten state, from 0 to 10 weight percent of a polyethylene or ethylene-vinyl acetate polymer, from 0 to 20 weight percent of a high molecular weight wax melting at about 250° F. and the remainder of a paraffin wax melting at a temperature of approximately 165° F. and marketed by Union Oil Company of California under the trademark Aristowax 165. Droplets of the molten compositions are solidified to form homogeneous solid particles.

The oil solubilities of the solid compositions are determined by placing four approximately 3/16 inch diameter particles of the compositions to be tested in each of four 6-dram vials filled with a solvent comprised of 50 volume percent kerosene and 50 volume percent of 90 neutral oil (a paraffinic lubricating oil having a viscosity of about 90 SUS at 100° F.). One of the vials is placed in each of four ovens maintained at temperatures of 200, 210, 220 and 230° F. respectively, and rotated therein at about 16 r.p.m. for a 24 hour contacting period. After six hours of the contacting period, the vials are temporarily removed from the ovens and their contents separately poured over four 100 mesh U.S. Standard Sieve screens and each screen visually examined to determine the amount of solid particles remaining undissolved. The solvent and the solid particles are replaced in the vials and the vials returned to the ovens and rotated therein for the remainder of the 24-hour contacting period. At the end of the period, the contents of the vials are again separately poured over 100 mesh U.S. Standard Sieve screens and the amount of undissolved particles determined.

The results of these tests are reported in Table IV. The solid compositions which are less than 50 volume percent dissolved in the solvent after 6 hours and more than 50 volume percent dissolved after 24 hours, and which exhibit a solubility difference of at least 50 volume percent upon contacting the solvent during the time span between 6 and 24 hours at any of the contacting temperatures, are considered to possess the desired delayed oil solubility for purposes of this invention and are designated "satisfactory." The solid compositions that are more than 50 volume percent dissolved and those compositions that are less than 50 volume percent dissolved after 6 hours and exhibit a As is apparent from the aforegoing table, the presence of both a polymer component and a retarding agent is necessary in order to achieve the desired delayed oil solubility. The range of from 2 to 15 weight percent of polymer and of from 3 to 20 weight percent of retarding agent is shown to be within the operable bounds of the invention while the presence of 20 weight percent polymer is shown to result in an unsatisfactory composition.

EXAMPLE 15

A particulate solid well treating composition is prepared by admixing in their molten states (1) a paraffin wax that has a melting point of about 160° F. and 170° F., (2) about 5 weight percent of molten ethylene-vinyl acetate copolymer containing about 17 to 19 weight percent vinyl acetate and exhibiting a melt index of about 2.1 to 2.9 grams per 10 minutes, (3) about 5 weight percent of amide wax melting at approximately 316° F., and (4) about 0.1 weight percent of 2,6-di-tertiary butyl-para-cresol, an oxidation inhibitor.

The molten composition is formed into discrete solid particles of the following size ranges:

(1) Flat buttons having a thickness of approximately 1/16-inch and a diameter of about 1/4-inch to 3/8-inch;
(2) Particles having sizes in the range of about 8 to 100 mesh U.S. Standard screen; and
(3) Particles having sizes in the range of about 1 micron to 100 mesh U.S. Standard screen.

Approximately 50 percent of the particles in the 8 to 100 mesh size range have sizes in the range of 8 to 20 mesh U.S. Standard screen and about 50 percent having sizes in the range of 20 to 100 mesh.

EXAMPLE 16

This example illustrates the use of the method and composition of this invention in treating a high-temperature, subterranean oil-containing reservoir to stimulate the recovery of oil therefrom. The well is completed in a relatively deep reservoir having a temperature of 210 to 220° F., with a total productive interval of about 148 feet perforated with two holes per foot at the depths of 10,240 to 10,280 feet and 11,360 to 11,468 feet.

The stimulation treatment is performed by injecting 3,000 gallons of 15 percent hydrochloric acid into the well, then introducing 12 pounds of particulate diverting agent, and then injecting another 3,000 gallons of acid. The diverting agent comprises flat buttons approximately 1/4 inch to 3/8 inch in diameter of the slowly oil-soluble, water-insoluble homogeneous solid composition described in Example 15. The initial slug of acid is injected into the well under vacuum. However, the second slug of acid injected after treatment with the diverting agent particles is injected at a surface pressure of 1,100 p.s.i.g.

Upon completion of the acid injection, the well is flushed with lease crude and then with water, and the well returned to production. The production rate of oil is observed and found to be substantially higher than the rate prior to the stimulation treatment, which indicates that the stimulation treatment is successful and that the diverting agent particles are substantially removed from the oil-producing zones.

EXAMPLE 17

This example illustrates the use of the method and composition of this invention in fracturing a high-temperature, subterranean oil-producing formation. A production well is completed in a reservoir having a temperature of 200 to 210° F., with a total productive interval of 20 feet perforated with two holes per foot at the depths of 8,410 and 8,415 feet and 8,428 to 8,443 feet.

Fracturing is accomplished by injecting 10,000 pounds of 20 to 40 mesh sand in 10,000 gallons gelled brine into the well at a volume flow rate and pressure sufficient to fracture the formation. After approximately one-half of the fracturing fluid is injected, 10 pounds of diverting agent particles are slugged into the well and the fracturing fluid injection contined. The diverting agent comprises flat buttons approximately ¼-inch to ⅜-inch in diameter of the slowly oil-soluble, water-insoluble homogeneous solid composition described in Example 15. The initial portion of the fracturing fluid is injected at a surface pressure of 800 p.s.i.g. However, the injection pressure is increased to 1,300 p.s.i.g. after treatment with the diverting agent.

Upon completion of the fracturing operation, the well is flushed with lease crude and returned to production. The production rate of oil is observed and found to be substantially higher than the rate prior to fracturing, which indicates that the fracturing operation is successful and that the diverting agent particles are substantially removed from the oil-producing zones.

EXAMPLE 18

This example illustrates the use of the method and composition of this invention in drilling a well into a high-temperature formation having a temperature of 220 to 225° F. This well had previously been drilled to a depth of 10,405 feet and then plugged to a depth of 10,383 feet with pea gravel and cement. For a number of years the well was produced from a productive interval from 10,200 to 10,380 feet. However, it is now desired to open lower zones to production.

The plug is drilled out using a 3¾-inch-diameter bit on a conventional tubing string. Brine is used as a drilling fluid, and is circulated from the surface to the drilling zone and returned to the surface. The well is drilled from 10,383 feet to 10,390 without incident, but circulation is lost to the formation at 10,395 feet. Approximately 750 pounds of diverting agent particles are added to a gelled brine and the drilling resumed using this material as the drilling fluid. The diverting agent comprises particles of the slowly oil-soluble, water-insoluble homogeneous solid composition described in Example 15, the particles having sizes in the range of 8 to 100 mesh U.S. Standard screen, with approximately 50 percent of the particles having sizes in the range of 20 mesh and 50 percent having sizes in the range of 20 to 100 mesh. After addition of the diverting agent, good fluid circulation is observed. Drilling is continued to a depth of 10,405 feet without further difficulty.

The gelled brine is displaced from the well with ungelled brine, and again the formation did not take fluid. Then, 14 barrels of lease crude is placed in the well and allowed to stand overnight. After the oil soak, it is observed that the formation is open and readily capable of taking fluid.

While particular embodiments of the invention have been described, it will be understood, of course, that the invention is not limited thereto since many obvious modifications can be made, and it is intended to include within this invention any such modifications as will fall within the scope of the claims.

The invention having thus been described, we claim:

1. A method of treating a high-temperature subterranean formation penetrated by a well bore comprising injecting through said well bore and into contact with said formation a liquid having suspended therein discrete slowly oil-soluble, water-insoluble solid particles comprised of a homogeneous mixture of (1) about 2 to 15 weight percent of a polymer selected from the class consisting of polyethylene and an ethylene-vinyl acetate copolymer containing about 15 to 30 weight percent vinyl acetate or combination of both, (2) about 75 to 90 weight percent of a paraffin wax having a melting point between about 130° F. and 175° F., and (3) about 1 to 20 weight percent of an oil solubility retarding agent selected from long chain aliphatic hydrocarbons, aliphatic amides and oxidized hydrocarbon waxes having a melting point at a temperature between about 250° F. and 325° F.

2. The method defined in claim 1 wherein the melt index of said polyethylene is from 0.1 to 50 grams per 10 minutes and the melt index of said ethylene-vinyl acetate is from 1 to 500 grams per 10 minutes.

3. The method defined in claim 1 wherein said polyethylene polymer is selected from Table I.

4. The method defined in claim 1 wherein said ethylene-vinyl acetate copolymer is selected from Table II.

5. The method defined in claim 1 wherein said oil solubility retarding agent is selected from Table III.

6. The method defined in claim 1 wherein said ethylene-vinyl acetate copolymer contains about 17 to 19 weight percent vinyl acetate and exhibits a melt index of about 2 to 3 grams per 10 minutes, and wherein said paraffin wax has a melting point between about 160° F. and 170° F.

7. The method defined in claim 1 wherein the temperature of said formation is between about 200° F. and 250° F.

8. The method defined in claim 1 wherein said oil solubility retarding agent is selected from the group consisting of Fischer-Tropsch waxes, fatty acid amides and natural waxes.

9. The method of completing a well drilled into a permeable, high-temperature subterranean formation, which comprises circulating a completion fluid from the surface to a drilling zone in said formation during the drilling operation and returning to the surface at least a portion of said fluid, said completion fluid comprising a liquid having suspended therein discrete slowly oil-soluble, water-insoluble solid particles comprised of a homogeneous mixture of (1) about 2 to 15 weight percent of a polymer selected from the class consisting of polyethylene and an ethylene-vinyl acetate copolymer containing about 15 to 30 weight percent vinyl acetate, or combination of both, (2) about 75 to 90 weight percent of a paraffin wax having a melting point between about 130° F. and 175° F., and (3) about 1 to 20 weight percent of an oil solubility retarding agent selected from long chain aliphatic hydrocarbons, aliphatic amides and oxidized hydrocarbon waxes having a melting point at a temperature between about 250° F. and 325° F.

10. The method defined in claim 9 wherein the melt index of said polyethylene is from 0.1 to 50 grams per minute and the melt index of said ethylene-vinyl acetate copolymer is from 1 to 500 grams per 10 minutes.

11. The method defined in claim 9 wherein said ethylene-vinyl acetate copolymer contains about 17 to 19 weight percent vinyl acetate and exhibits a melt index of about 2 to 3 grams per 10 minutes, and wherein said paraffin wax has a melting point between about 160° F. and 170° F.

12. The method defined in claim 9 wherein the temperature of said formation is between about 200° F. and 250° F.

13. A method of fracturing a permeable, high-temperature subterranean formation penetrated by a well, which comprises injecting a fracturing fluid into said well and into contact with said formation at a pressure and volumetric flow rate sufficient to fracture said formation, said fracturing fluid comprising a liquid having suspended therein discrete oil-soluble, water-insoluble solid particles of a homogeneous mixture of (1) about 2 to 15 weight percent of a polymer selected from the class consisting of polyethylene and an ethylene-vinyl acetate copolymer containing about 15 to 30 weight percent vinyl acetate, or combination of both, (2) about 75 to 90 weight percent of a paraffin wax having a melting point between about 130° F. and 175° F., and (3) about 1 to 20 weight percent of an oil solubility retarding agent selected from long chain aliphatic hydrocarbons, aliphatic amides and oxidized hydrocarbons, aliphatic amides and oxidized hydrocarbon waxes having a melting point at a temperature between about 250° F. and 325° F.

14. The method defined in claim 13 wherein the melt index of said polyethylene is from 0.1 to 50 grams per 10 minutes and the melt index of said ethylene-vinyl acetate is from 1 to 500 grams per 10 minutes.

15. A well treating composition comprising discrete solid particles of a homogeneous mixture of (1) about 2 to 15 weight percent of a polymer selected from the class consisting of polyethylene and an ethylene-vinyl acetate copolymer containing about 15 to 30 weight percent vinyl acetate, or combination of both, (2) about 75 to 90 weight percent of a paraffin wax having a melting point between about 130° F. and 175° F., and (3) about 1 to 20 weight percent of an oil solubility retarding agent selected from long chain aliphatic hydrocarbons, aliphatic amides and oxidized hydrocarbons, aliphatic amides and oxidized hydrocarbon waxes having a melting point at a temperature between about 250° F. and 325° F.

16. The composition defined in claim 15 wherein said polyethylene exhibits a melt index of from 0.1 to 50 grams per 10 minutes and wherein said ethylene-vinyl acetate exhibits a melt index of from 1 to 500 grams per 10 minutes.

17. The composition defined in claim 15 wherein said polyethylene polymer is selected from Table I.

18. The composition defined in claim 15 wherein said ethylene-vinyl acetate copolymer is selected from Table II.

19. The composition defined in claim 15 wherein said oil solubility retarding agent is selected from Table III.

20. The composition defined in claim 15 wherein said ethylene-vinyl acetate copolymer contains about 17 to 19 weight percent vinyl acetate and exhibits a melt index of about 2 to 3 grams per 10 minutes, and wherein said paraffin wax has a melting point between about 160° F. and 170° F.

21. The method defined in claim 15 wherein said oil solubility retarding agent is selected from the group consisting of Fischer-Tropsch waxes, fatty acid amides and natural waxes.

22. The method defined in claim 15 wherein said discrete particles have a mean diameter of between about 1 micron and about ½ inch.

23. A well treating composition comprising discrete solid particles of a homogeneous mixture of (1) about 8 to 12 weight percent of an ethylene-vinyl acetate copolymer containing about 17 to 19 weight percent vinyl acetate and exhibiting a melt index of about 2 to 3 grams per 10 minutes, (2) at least about 70 weight percent paraffin wax having a melting point between about 160° F. and 170° F., and (3) about 1 to 20 weight percent of an oil solubility retarding agent comprising a long chain fatty acid amide having a melting point between about 300° F. and 320° F.

References Cited

UNITED STATES PATENTS

| | | | |
|---|---|---|---|
| 3,205,186 | 9/1965 | Zaayenga | 260—28.5 AV |
| 3,302,719 | 2/1967 | Fischer | 166—280 |
| 3,401,169 | 9/1968 | Mills | 260—28.5 A |
| 3,407,162 | 10/1968 | Rundle | 260—28.5 AV |
| 3,477,512 | 11/1969 | Siegele | 166—283 |
| 3,505,259 | 4/1970 | Hallis, Jr. | 260—28.5 AV |
| 3,515,691 | 6/1970 | Arabian | 260—28.5 AV |
| 3,627,568 | 12/1971 | Padgett et al. | 260—28.5 AV X |
| 3,630,280 | 12/1971 | Fischer et al. | 166—295 X |
| 3,644,254 | 2/1972 | Dew | 260—28.5 AV |
| 3,684,012 | 8/1972 | Scheffel et al. | 166—283 |

STEPHEN J. NOVOSAD, Primary Examiner

U.S. Cl. X.R.

166—295; 175—65; 252—8.5 C, 8.55 R; 260—28.5 A, 28.5 AV